United States Patent [19]

Barnsdale, Jr. et al.

[11] Patent Number: 4,685,056
[45] Date of Patent: Aug. 4, 1987

[54] COMPUTER SECURITY DEVICE

[75] Inventors: William J. Barnsdale, Jr., West Sacramento; Frank G. Ford, Sacramento, both of Calif.

[73] Assignee: Pueblo Technologies, Inc., Kelseyville, Calif.

[21] Appl. No.: 743,592

[22] Filed: Jun. 11, 1985

[51] Int. Cl.$^4$ .................................................. G06F 1/00
[52] U.S. Cl. ................................. 364/200; 340/825.3; 380/4
[58] Field of Search ................ 364/200 MS File; 178/22.08, 22.09

[56] References Cited

U.S. PATENT DOCUMENTS 4,384,326 5/1983 Devchoudhury ................ 364/200
4,590,552 5/1986 Guttag et al. .................... 364/200

Primary Examiner—Raulfe B. Zache

[57] ABSTRACT

A computer security decide for discouraging or preventing unauthorized entry into computer systems and for preventing the unauthorized copying of proprietary computer software or data in a computer system is disclosed. The security device is based at least in part in hardware and comprises logic device means, such as a programmable logic array or a ROM, for recognizing a group of signals present on a bus indicative of unauthorized copying efforts, latch means for remembering the detection of unauthorized copying efforts, and switching device means for interrupting the flow of DC supply power to preselected components or memory locations within the computer system containing memory whose contents is to be protected to render said components or locations inaccessible. The various embodiments of the invention presented each monitor one or more buses for signals representing an unauthorized address, data or commands or sequence of addresses, data or commands indicative of either unauthorized entry into a computer system or unauthorized copying.

18 Claims, 7 Drawing Figures

COMPUTER SECURITY DEVICE

This invention relates to devices for preventing entry into computer systems, for preventing unauthorized access to predetermined computer memory locations, and for discouraging or preventing the unauthorized copying of proprietary computer software or data.

BACKGROUND OF THE INVENTION

Over the last few decades, an ever-increasing amount of software has been distributed by commercial software vendors. A great deal of this software has been subject to unauthorized copying, since those software obstacles which have been erected to prevent copying have been circumvented by increasingly sophisticated copying techniques used by consumers or competitors.

There has also been an ever-increasing number of computer systems and databases which can be accessed remotely via telephone, microwave or even satellite links. The security of many of these systems, and often times the integrity of the data stored therein, is subject to compromise or has been compromised by unauthorized persons. Recent reports in the media and trade journals about hackers, embezzlers and others document this growing problem.

The increasing use of electronic equipment by banks and other financial institutions to conduct transactions among themselves and with their customers, such as transferring funds, or sending and receiving other financially sensitive information, has spawned additional computer security problems. Insiders or others with the proper passwords and/or command sequences are able to subvert these electronic funds transfer systems for their own gain, at times without being detected. Sensitive financial information, for example, may be compromised by an unauthorized person who inspects but does not alter the information.

To combat these growing problems, a number of alternative solutions have recently been proposed. The following U.S. Pat. Nos. are examples of the general state of the art regarding solutions for various computer security problems:

4,105,156
4,120,030
4,183,085
4,246,638
4,377,844
4,433,207

SUMMARY OF THE INVENTION

The present invention relates to devices based at least in part in hardware for use in preventing unauthorized copying or duplication of computer software and for use in preventing unauthorized entry into computer systems. It is an object of the present invention to provide a computer security device, based in whole or in part upon hardware, that acts to defeat unauthorized entry into computer based systems by monitoring address and/or data lines of an appropriate bus for an unauthorized memory address or an unauthorized sequence of memory addresses or memory addressing commands, and upon detecting same, disabling a predetermined group of memory locations or disabling selected memory access circuitry.

Another object of the invention is to provide a low-cost computer security device which prevents an unauthorized person from sequentially copying an entire program that is at least in part protected by the security device.

Yet another object is to provide a computer security device for protecting software which is transparent to the end user, except during unauthorized attempts to access protected software.

Still another object is to provide a computer security device that requires no passwords or special keys, that imposes little or no drain upon CPU execution time, and that is easily installed in a computer system where it is to be used to prevent unauthorized copying.

The security device of the present invention is usable with any digital system employing specific memory addresses to indicate discrete portions of memory to be read, and may be used to strongly discourage and/or prevent unauthorized entry into computer based systems and unauthorized access to computer memory locations which are to be protected against copying. The security device detects any effort within the system to address certain arbitrarily selected memory locations, which have been predefined as unauthorized or "booby-trapped" addresses. Alternately, the security device may be set up to detect an unauthorized sequence of memory addresses or memory addressing commands, or unauthorized data values or sequences of data values. When the security device detects the use of an unauthorized address (or data value, or sequence of unauthorized addresses, commands or data values), it remembers the event and deactivates selected portions of memory, either permanently or temporarily, depending upon which mode of deactivation is desired.

In one embodiment of the invention, the specific addresses which have been selected as the unauthorized or booby-trapped addresses must be known to at least those persons who are developing the software which is to be run on a digital system that employs the aforementioned security device, so that the software can be intentionally arranged so that it never attempts to access those memory locations. Persons who are not privy to which memory locations are booby-trapped are deemed unauthorized persons, and any attempt by such persons to copy software or data resident in the memory locations protected by the present compute security device will result in deactivation of selected memory locations, which effectively incapacitates the software.

The security device of the present invention is referred to by the assignee as the "POP circuit" and the "POP chip", wherein POP stands for Program Operation Protection. The term "POP chip" is used to refer to the security device when it is substantially embodied within a single monolithic integrated circuit device. In the POP chip, the POP circuit may take the form of an additional overlay during the masking process.

In another embodiment of the invention, programs employing random number generators may be used to determine and place one or more booby-trapped addresses within a software package to be protected by a POP chip and concurrently program a POP chip to be activated by the selected booby-trapped address(es). In this embodiment, it is not necessary for anyone to be privy to which addresses are booby-trapped.

POP circuits which are not integrated into the memory chip to be protected are particularly useful in that they may be installed in parallel to conventional memory devices. Also, they may be installed along side of existing security devices or schemes without interfering with them.

In a preferred embodiment, the POP circuit continually monitors address lines for addresses (or data lines for data indicative of addresses) coming into the memory chip(s) whose contents are protected by the POP circuit. The POP circuit may be designed so as to monitor addresses related to a single memory chip, or addresses related to a plurality of discrete memory chips. If only addresses or address-related data pertinent to a single memory chip are to be monitored, the POP circuit can if desired be incorporated into the memory chip itself by including the POP circuitry in the chip along with the usual internal control circuitry used in the memory chip.

In another embodiment of the present invention, the POP circuit can be arranged to monitor address lines for a certain sequence of addresses, or data lines for data indicative of a certain sequence of addresses or memory addressing commands. when such an unauthorized sequence is detected, indicating that an unauthorized attempt to copy protected memory locations is being made, selected memory locations will be disabled as in the other embodiment. In this embodiment, a counter monitoring addresses on a bus may be used to detect such an unauthorized sequence.

The POP circuit or POP chip of the present invention can be used in a wide variety of applications. It can be applied, for example, to prevent the copying of software used by personal computers having a cartridge port through which additional read-only memory (ROM) forming a part of the computer's main memory may be added. In this application, the software to be protected is written by the software vendor in part on a disk and in part on a cartridge. The cartridge includes a ROM chip and a POP circuit set up to detect access to selected unauthorized addresses on the ROM chip. The software is intentionally distributed between the disk and the ROM chip in such a manner that key portions thereof reside only on the ROM. Accordingly, as the software is executed, the central processor periodically executes program steps or accesses critical data found only on the ROM at authorized (i.e., non-booby-trapped) memory locations.

An unauthorized person desiring to copy such software will typically use a utility program that sequentially copies all locations on the disk and on the ROM. The software resident on the disk may be successfully copied because it is not protected by a POP circuit. However, that piece of software does not constitute the entire program, and by itself is totally or largely inoperable. The remainder of the software, located on the ROM chip protected by the POP circuit, cannot be successfully copied because one of the booby-trapped addresses would be accessed in any attempt to sequentially copy the contents of the ROM, and the POP circuit will disable the ROM to stop any further copying.

In accordance with the foregoing objects and description, one embodiment of the present invention may be more specifically described as a computer security device for preventing unauthorized access to preselected memory locations in a digital computer system having a central processing unit (CPU), at least one integrated circuit (IC) memory device that includes several contiguous memory locations individually definable by discrete addresses, and at least one bus for the parallel transmission of address or data information between the CPU and memory device. In this embodiment, the security device is comprised of at least three elements. The first element is logic device means external to said CPU for recognizing a group of signals present on said bus associated with accessing at least one memory location which has been predefined as a memory location which will not be intentionally accessed during the execution of authorized programs by the CPU. The first element generates a first signal in rsponse to recognizing the foregoing group of signals. The second element is latch means for generating and maintaining a second signal whenever the first signal has been received from said logic device means. The third element is switching device means, connectable to the memory device, for interrupting the flow of DC supply power to said preselected memory locations within the memory device to prevent any further access thereto when the second signal is received.

BRIEF DESCRIPTION OF THE DRAWINGS

Other objects, features and advantages of the present invention will become apparent from the subsequent description and the appended claims taken in conjunction with the accompanying drawings, in which:

DETAILED DESCRIPTION OF THE PREFERRED EMBODIMENT

Figure 1:
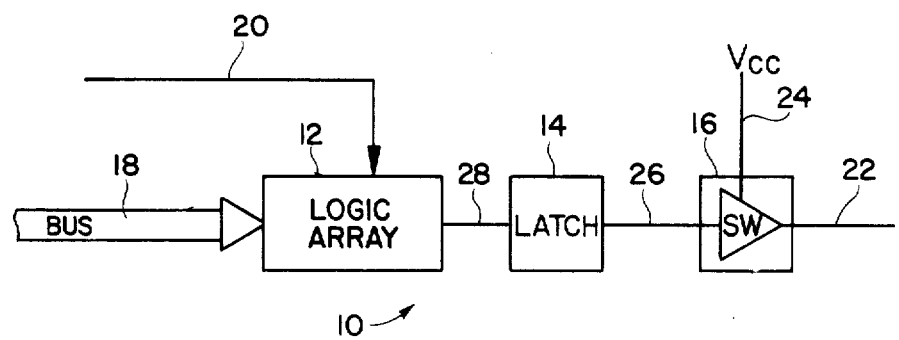
FIG. 1 is a block diagram of one embodiment of the computer security device of the present invention.

In FIG. 1, there is shown in block diagram form a computer security device 10 of the present invention comprised of a logic array 12, a latch 14, and a switching device 16 connected as shown. The input 18 to logic array 12 is a bus, such as an address bus, a data bus, or a combined address/data bus. The specific type of bus which serves as the input will be determined by the application in which the security device 10 is used. If bus 18 is an address/data bus, then an additional input 20 to logic array 12 may be used to indicate whether the information presently on the bus represents data or an address. As will be explained further below, in some computer architectures, it may be preferable to monitor data on the bus instead of addresses on the bus. However, for present purposes, it will be assumed that addresses are on the bus.

Output line 22 of switching device 16 is connected to the DC power pin of the memory module or chip to be protected by security device 10. Line 24 delivers to switching device 16 the DC power required to operate the protected memory module. Line 26 serves as an input to switching device 16 and the state of line 26 determines whether or not DC power will be allowed to flow through swtiching device 16 to line 22. Line 28 connects the output of logic array 12 with the input of latch 14.

In a preferred embodiment of the FIG. 1 security device 10, the output of logic array 12 is designed to go high when an illegal address (or data indicative of an illegal address) is encountered. When the output 28 of logic array 12 momentarily goes high, this is sensed by latch 14, and the output of latch 14 goes high and remains high at least long enough to allow switching device 16 to disable the memory module (or modules) to which it is connected.

Switching device 16 is preferably solid-state, although it may be a suitably sized electromechanical relay in certain applications especially those having relatively large DC power requirements. Device 16 may be self-destructive or nondestructive, as desired. In its normal mode, switching device 16 supplies DC power, such as Vcc, to the desired memory module, such as a ROM or an I/O port through which auxiliary memory is accessed. When logic array 12 senses the security is being violated, e.g., an illegal address has been encountered, the DC power to the memory module is shut off permanently or until switching device 16 is reset.

The output of the POP circuit of the present invention may be connected in some instances, not to the DC power connections of the memory chip to be protected, but instead to a specially provided pin found in some memory chips which can deactivate the memory chip. For example, a number of commercially available PROMs have a standby mode which is entered by allowing a specified pin of the PROM to go high. In such applications, the POP circuit of FIG. 1 could be simplified by eliminating switching device 16 and connecting the output of the latch 14 directly to the standby mode pin of the memory device.

Figure 2:
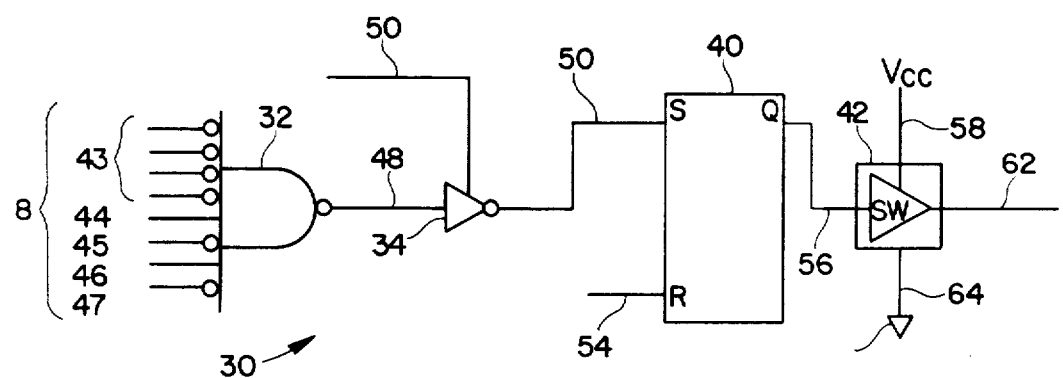
FIG. 2 is a simplified schematic diagram of the FIG. 1 security device.

Turning to FIG. 2, one embodiment 30 of the security device 10 of FIG. 1 is shown, illustrating in schematic diagram form the internal components which may be used therein. Security device 30 includes NAND gate 32, inverter 34, S-R flip-flop 40 and switching device 42 connected as shown. Eight lines designated by reference numerals 43, 44, 45, 46 and 47 from a bus 18 containing address or data information are connected as inputs to NAND gate 32. The lines for the four higher order bits are designated by reference numeral 43, while the lines for the four lower order bits are designated by numerals 44 through 47. (Buses having a greater or fewer number of lines may be monitored by appropriately altering NAND gate 32.) Lines 43, 45 and 47 are inverted as they enter NAND gate 32, as is indicated by the small circles at the ends of these lines. By selectively inverting certain of the lines from the bus, NAND gate 32 will monitor the bus for a specific preselected address (or data) pattern, such as the "0000 1010" pattern illustrated in FIG. 2. when the preselected address is detected, line 48 is forced low by the output of NAND gate 32.

Inverter 34 is tristated to go high only when the address (or data) control line 50 is activated. Assuming control line 50 is on and line 48 is low, inverter 34 will make line 52 go high, thus causing the output 56 of flip-flop 40 to turn on (i.e., go high). Flip-flop 40 will remain on only as long as line 54 is low.

Switching device 42 is self-destructing, so that when line 56 is high, the power path between DC power line 58 and line 62 leading to the power pin of the memory module to be protected is permanently opened. In this manner, the entire memory module is disabled until such time as the POP circuit 30, or at least switching device 42 therein, is replaced.

Switching device 42 in a preferred embodiment has pin 62 normally high, and pin 58 connected to Vcc. In an alternate embodiment, switching device 42 may be normally low, in which case, pin 62 is connected to ground through pin 64, and when opened by detection of an illegal address, will cause the total destruction of the memory module.

In another embodiment, switching device 42 is nondestructive, and flip-flop 40 may be reset by allowing line 54 to go high. This allows line 62 to go high to permit the protected memory to be accessed again.

One technique for permanently self-destructing a switching device like device 42 is to have a solid-state switch therein act a a fusible link by shunting an amount of current considerably in excess of the maximum rated value of the switch from the DC supply source to DC common 55 long enough to open the switch.

Figure 3:
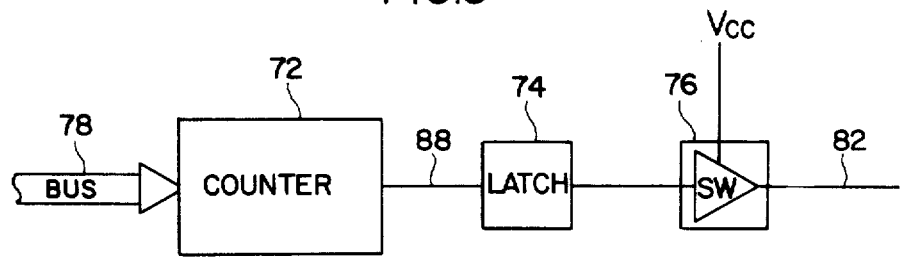
FIG. 3 is another embodiment of the computer security device of the present invention.

In FIG. 3, another embodiment 70 of the security device of the present invention is shown, which includes counter 72. Counter 72 may be implemented, for example, using a simple Mealy counter circuit of the type found in digital alarm systems. Also included are latch 74 and switching device 76 which operate in the same manner as latch 14 and switching device 16 in FIG. 1. Counter 72 monitors addresses (or data indicative of addresses or memory addressing commands) present on bus 78 which is also connected to a CPU (not shown). If a command to copy the contents of the protected memory module being supplied with power by switching device 76 through line 82 is transmitted along bus 78, counter 72 recognizes this, and produces an output on line 88, which activates latch 74. This causes switching device 76 to open, thus disabling the memory module or secured chip being protected by POP circuit 70.

One version of the FIG. 3 embodiment bases the design of counter 72 upon a Mealy counter circuit. In such a counter, a correct sequence of specific commands or codes is required to obtain access to the memory locations being protected. Any attempt to access these memory locations which deviates from the prescribed sequence turns on the output 88 of counter 72, thus activating latch 74.

One important advantage of the FIG. 3 embodiment is that a set of memory locations or a memory chip, such as a ROM or RAM, can be protected without having to implant (i.e., reserve or specify) any booby-trapped memory loations on the memory chip. This is especially useful for protecting memory chips that have no room for booby-trapped address locations, i.e., such as certain look-up tables and cryptographic chips. This method may also be used to protect software or firmware that has already been developed without provisions for reserving certain addresses to serve as booby-trapped addresses.

Figure 4:
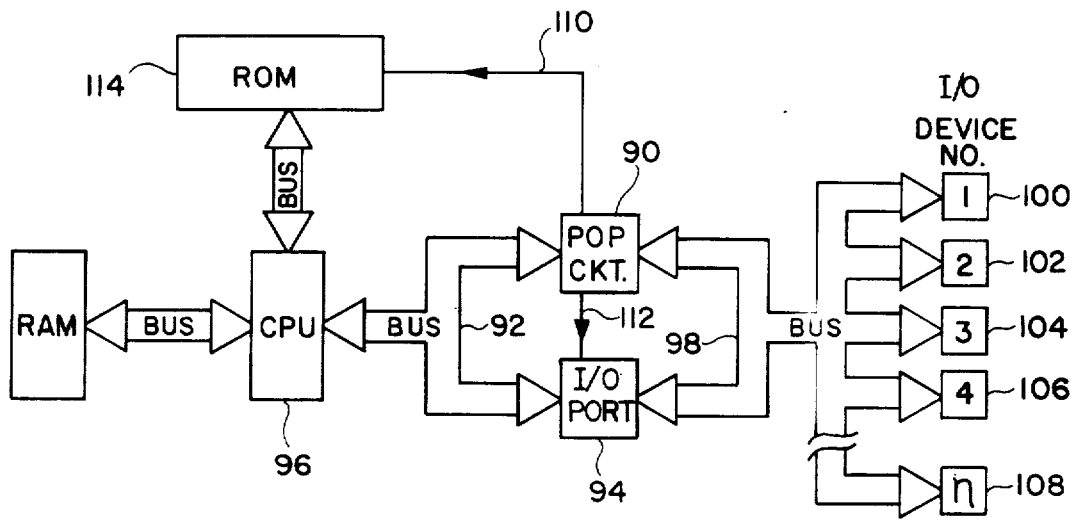
FIG. 4 is a block diagram illustrating a possible use of the computer security device of the present invention.
Figure 5:
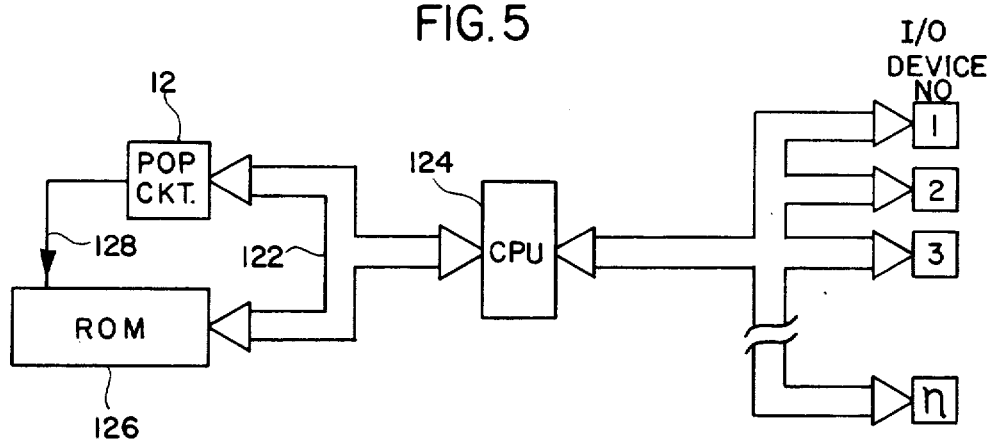
FIG. 5 is a block diagram illustrating another possible use of the computer security device of the present invention.

FIGS. 4 and 5 illustrate the POP circuit as it might be used in two different applications. In FIG. 4, POP circuit 90 is connected to the bus 92, which sends and receives addresses, commands and/or data between I/O selector port 94 and CPU 96, and to the I/O bus 98, which transfers addresses and/or data to and from various I/O devices 100 through 108. POP circuit 90 is arranged internally with two programmable logic arrays to monitor both bus 92 and bus 98 so as to detect a series of commands to I/O port 94 indicative of efforts to copy memory locations on I/O devices to be protected. When POP circuit 90 detects an unauthorized address, datum or sequence, it turns off DC power flowing through lines 110 and 112 to ROM 114 and to I/O port 94, thus preventing further breaches of computer security. I/O device 100 could be, for example, a floppy disk controller, and POP circuit 90 could be monitoring addressing commands to see if a certain unauthorized sector of the floppy disk has been accessed, which would indicate unauthorized copying is being attempted.

In FIG. 5, POP circuit 120 is used to directly monitor addresses (or sequences of addresses, commands or data indicative of access to unauthorized memory locations or attempts to copy protected memory locations) placed on bus 122 by CPU 124 for the purpose of reading the contents of ROM 126. Line 128 from POP circuit 120 supplies DC power required to operate ROM 126. Upon detecting a security breach of the above-mentioned type, POP circuit 120 powers down ROM 126.

Having set forth the foregoing two applications of the POP circuit, those skilled in the art will appreciate that POP circuits can be used in a wide variety of applications. The individual designs of the POP circuit may vary markedly from system to system depending upon the system architecture and the addresses or sequences of addresses or commands to be monitored.

Figure 6:
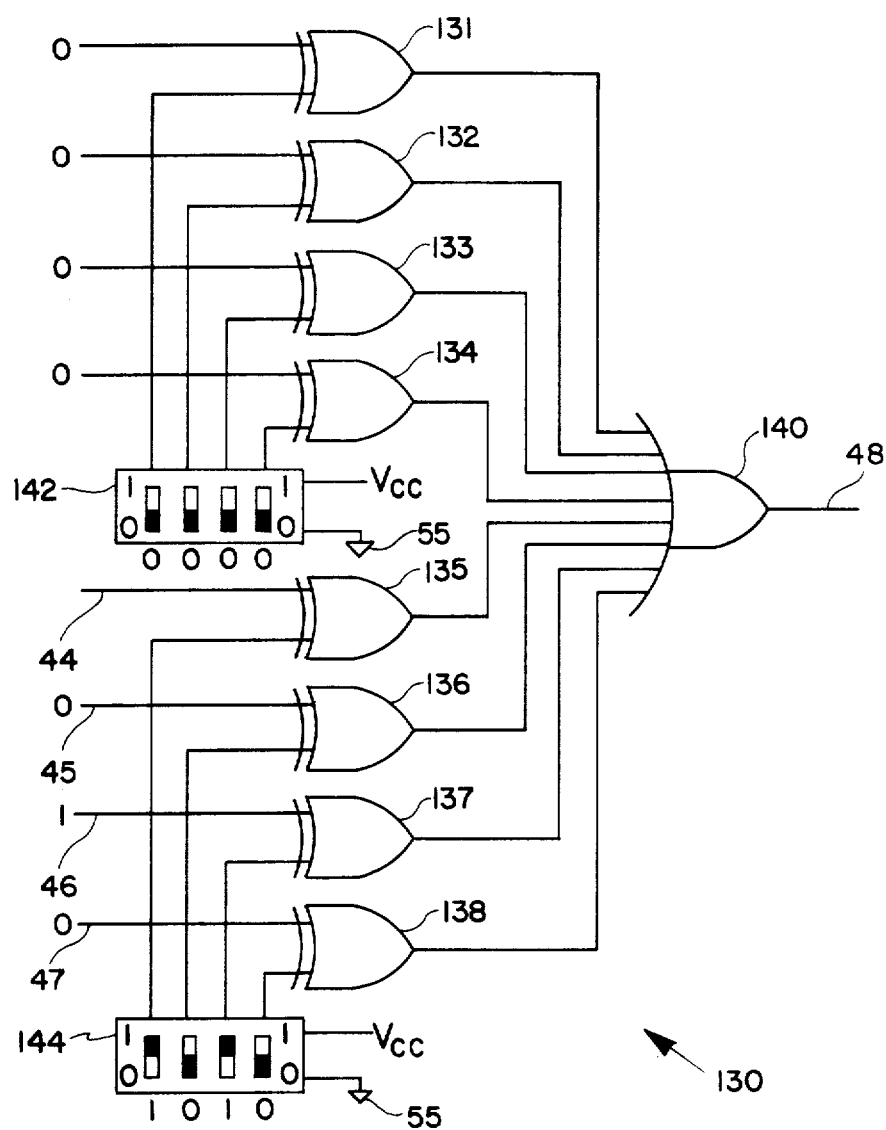
FIG. 6 is a circuit diagram of a DIP switch circuit which may be used in conjunction with the computer security device of the present invention.

FIG. 6 shows a switch and gate circuit 130 designed to replace NAND gate 32 in the FIG. 2 embodiment. Switch and gate circuit 130 allows the POP circuit of FIG. 2 to be manually programmed in the field to any given eight bit address which is to be booby-trapped. Circuit 130 includes the following components connected as shown: eight Exclusive OR gates 131 through 138, an eight input OR gate 140, and two quad DIP switch packages 142 and 144 connected to DC power (Vcc) and DC common 55. The DIP switches of packages 142 and 144 are illustrated in FIG. 6 in a position for detecting the address "0000 1010" on bus 18. When that address is received, output 48 of OR gate 140 will change from high to low. The remainder of the POP circuit 30 in FIG. 2 operates as described previously.

Those skilled in the art will appreciate that the POP circuits of the present invention may be implemented in programmable versions using a programmable logic array or the like for logic array 12 in FIG. 1. It will also be appreciated that a programmable POP circuit could be inexpensively constructed about a few registers and a memory chip such as a small PROM or EPROM, or by using a small microprocesser with a suitable amount of working memory attached thereto. In these three alternatives, sequences of addresses, commands or data could be entered into the POP circuit's memory, such as by programming the PROM or EPROM.

In one embodiment of the present invention, the specific addresses which have been selected as unauthorized need not be known to anyone. Once the application software or program has been written, another program may be written to insert illegal address or data locations in the application program, via a random number generator. Then, these addresses may be committed to computer memory long enough for a normal ROM to be programmed to contain the application program with the booby-trapped addresses and a POP ROM to be programmed by the computer so as to activate the remainder of the POP circuit when one of the booby-trapped addresses is encountered. The POP ROM may be placed in parallel with the normal ROM to be protected by the POP circuit.

Figure 7:
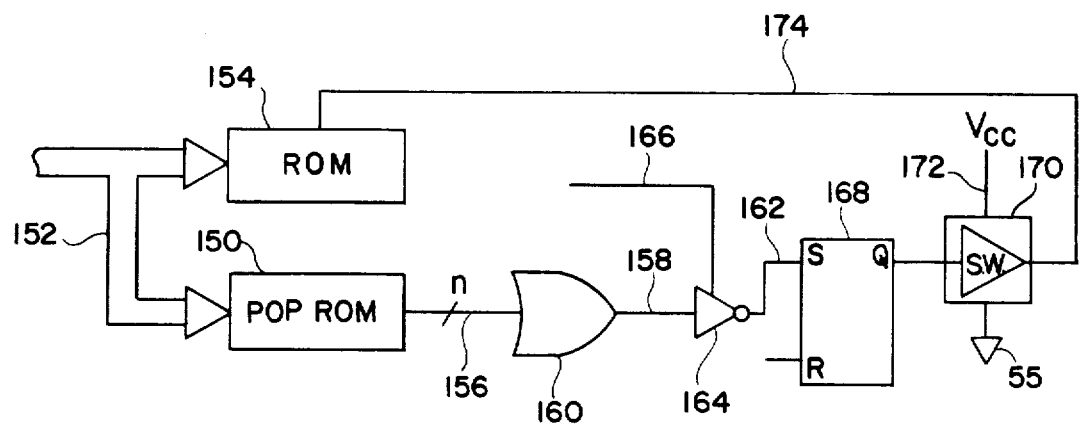
FIG. 7 is a circuit diagram of a POP circuit employing a POP ROM.

FIG. 7 illustrates one possible implementation of the foregoing embodiment. The POP ROM 150 is connected to bus 152, as is the normal ROM 154, which contains the application program to be protected. The POP ROM 150 outputs all zeroes on parallel lines 156 when an illegal address is encountered or bus 152. The output 158 of OR gate 160 then goes low (i.e., goes to zero), which allows the output 162 of tri-stated inverter 164 to become high when enabled by an address enable strobe signal on line 166. Flip-flop 168 turns on, activating DC power switch 170, and interrupting the flow of DC power from line 172 through switch 170 to the ROM 154 via line 174. The contents of ROM 154 are thus rendered inaccessible, either permanently or temporarily, depending upon, for example, whether power switch 170 is self-destructive and whether flip-flop 168 is resettable.

In system architectures, such as systems employing pipeline designs, where an operand and associated address information (if any) are fetched from memory before the previous operand had been fully executed, it is highly desirable to monitor a data line, or a sequence of addresses or commands. If not, the POP circuit may well be activated when the program counter advances to an operand address immediately before a booby-trapped address during an otherwise legal operation. If the data line in this type of architecture is monitored for booby-trapped addresses, as opposed to monitoring the address lines directly, then this problem will be overcome. Note that in dealing with such architectures, the aforementioned problem with monitoring for booby-trapped addresses directly may be overcome by placing a jump command or similar instruction, (followed by one or more NOP instructions, if necessary) before a booby-trapped address so that the operand of the booby-trapped address is never read during a normal access.

The software to be run on a computer system protected by a POP circuit which booby-traps selected addresses should be arranged to always skip those addresses. Jump instructions or conditional branches may be used to cause such skipping. If only unconditional jump instructions are used, then the software may possibly be subject to unauthorized copying by single-stepping the system through its entire sequence. Conditional branches may be employed to deter such copying. Specifically, the programmer may intentionally arrange for a certain compare instruction to always have a certain result, so that during normal operation, the conditional branch always steers the program away from the other (normally unused) branch which is set up to lead to a booby-trapped address. The unauthorized copier, in his desire to completely copy the program, can be expected to attempt to follow both the normal and booby-trapped branches of the conditional branch instruction, thus triggering the POP circuit. Several (or even many) jumps and conditional branches may also be strategically placed throughout the software to complicate efforts to copy it and enhance the likelihood of an unauthorized copier hitting a booby-trapped address.

An example of data which may be booby-trapped is data whose bit pattern: (1) corresponds to none of the opcodes used in the instruction set of the digital system in which the POP circuit is employed, and (2) is known not to occur on the data bus being monitored by the POP circuit, at least not under certain predetermined conditions which can be readily monitored by the POP circuit. Such bit patterns may be a sequence of bits in a single byte or in several memory locations, which may be or may not be contiguous.

While the invention has been particularly shown and described with reference to preferred embodiments thereof, it is to be understood by those skilled in the art that various changes in form and details may be made therein without departing from the spirit and scope of the invention.

We claim:

1. In a digital computer system having a central processing unit (CPU), at least one memory device that includes several contiguous memory locations individually definable by discrete addresses, and at least one bus forming at least part of a path for the parallel transmission of information between the CPU and memory device, a security device for preventing unauthorized access to preselected memory locations within the memory device, comprising:
   logic device means external to said CPU and said memory device for recognizing a group of signals present on said bus associated with accessing at least one memory location which has been predefined as a memory location which will not intentionally be accessed during the execution of authorized programs by the CPU, and generating in response thereto a first signal;
   latch means for generating and maintaining a second signal whenever the first signal has been received from said logic device means; and
   switching device means, connected to the memory device, for preventing further access to at least the preselected memory locations within the memory device when the second signal is received from said latch means.

2. The security device of claim 1 wherein the memory device is fabricated as a monolithic integrated circuit and the preselected memory locations include all memory locations within the memory device and wherein the switching device means prevents access to all memory locations within the memory device by interrupting the flow of DC supply power to the memory device.

3. The security device according to claim 1 wherein:
   the latch means is resettable upon occurrence of a predetermined external event; and
   the switching device means restores access to the preselected memory locations when the latch means is reset.

4. The security device according to claim 1 wherein the switching device means is self-destructing when operated so that it cannot be reset.

5. The security device of claim 1 wherein the switching device will normally supply DC power to the memory device until said second signal is received from the latch means, at which time the DC power will be interrupted.

6. The security device of claim 1 wherein the switching device is normally low and is connected to the DC common of said memory device, and will remain low until said second signal is received from the latch means, at which time the switching device will go high and destructively disable the memory device.

7. The security device of claim 1 wherein said logic device means is a logic array.

8. The security device of claim 7 wherein said logic array is programmable.

9. The security device of claim 1 wherein the logic device means includes at least one NAND gate for decoding said groups of signals on said bus.

10. The security device of claim 1 wherein the logic device means includes an input for receiving an address/data enable signal, and wherein said logic device means produces the first signal only when said input is in a predetermined state.

11. The security device of claim 1 wherein the group of signals recognizable by the logic device means corresponds to an address of at least one memory location on the memory device.

12. The security device of claim 1 wherein the group of signals recognizable by the logic device means corresponds to data stored within at least one memory location on the memory device.

13. The security device of claim 1 wherein the group of signals recognizable by the logic device means corresponds to a sequence of commands transmitted along the bus for accessing the memory device.

14. The security device of claim 1 wherein the logic device means includes a read-only memory programmed with multiple addresses corresponding to memory locations on the memory device which have been picked by a random number generator means as booby-trapped addresses.

15. In a digital computer system having a central processing unit (CPU), at least one memory device provided with several contiguous memory locations therein and with at least one terminal which when enabled allows access to said memory locations and when disabled prevents access to said memory locations, and at least one bus forming at least part of a path for the parallel transmission of addresses between the CPU and memory device, a security device for deterring copying the contents of the memory device, comprising:
   counter means, for monitoring a predetermined sequence of commands placed on the bus for the purpose of obtaining access to the memory device, for detecting any deviation from said predetermined sequence of commands, and generating in response to said deviation a first signal; and
   switching device means, connected to said terminal of the memory device, for disabling any further access to said memory locations within said memory device upon receipt of said first signal.

16. The security device of claim 15 wherein said switching device means includes a latch circuit that remembers the first signal was present even after the first signal is no longer present, said latch circuit being resettable upon the occurrence of a preselected external event.

17. The security device of claim 15 wherein the counter means is completed of a Mealy counter circuit.

18. The security device of claim 15 wherein said switching device means includes a nonresettable element that causes said switching device to permanently disable access to the IC memory device for as long as said switching device remains connected to said IC memory device.

* * * * *